United States Patent

[11] 3,624,184

| [72] | Inventors | Roger W. Cox<br>Baytown, Tex.;<br>Murray Nadler, Morris Plains, N.J. |
|------|-----------|--------------------------------------------------------------|
| [21] | Appl. No. | 743,724 |
| [22] | Filed | July 10, 1968 |
| [45] | Patented | Nov. 30, 1971 |
| [73] | Assignee | Esso Research and Engineering Company |

[54] PROCESS FOR CONTROLLING MONOMER RATIO IN COPOLYMERIZATION REACTION
10 Claims, 3 Drawing Figs.

[52] U.S. Cl. .................................................. 260/878,
260/88.2, 260/93.7, 260/94.9 B, 260/94.9 F, 260/95, 260/897
[51] Int. Cl. ..................................................... C08f 15/04
[50] Field of Search .......................................... 260/878, 878 B, 88.2, 897

[56] References Cited
UNITED STATES PATENTS

| 3,318,976 | 5/1967 | Short .......................... | 260/878 |
| 3,328,486 | 6/1967 | Crawford et al. ............. | 260/876 |
| 3,358,055 | 12/1967 | Erchak et al. ................. | 260/878 |
| 3,378,606 | 4/1968 | Kontos ......................... | 260/878 |
| 3,401,212 | 9/1968 | Griffin et al. ................. | 260/878 |

*Primary Examiner*—Harry Wong, Jr.
*Attorneys*—Thomas B. McCulloch, Melvin F. Fincke, John B. Davidson, John S. Schneider, Sylvester W. Brock, Jr. and Kurt S. Myers ABSTRACT: The present invention provides a process for controlling the ratio of two monomers in the second reaction zone of a two-zone polymerization process. The first monomer is polymerized in the first reaction zone and a varying amount of unreacted first monomer is discharged in a first zone effluent from said first reaction zone, caused by uncontrollable variation in the percentage conversion in the first reaction zone. The effluent from the first reaction zone is introduced into a flash zone which is maintained at a substantially constant but controllably variable pressure and temperature, the pressure being less than the pressure in the first reaction zone, so that a stabilized effluent from the flash zone can be obtained which is saturated with dissolved first monomer. If the temperature and pressure of the flash zone are such that the maximum solubility of the first monomer in the liquid phase exceeds the amount of monomer passed from the first reaction zone, additional amounts of the first monomer can be introduced into the flash zone in order to obtain such saturation. The stabilized effluent is then charged into a second reaction zone wherein the second monomer is coreacted with the first monomer.

INVENTORS.
ROGER W. COX,
MURRAY NADLER,
BY
ATTORNEY.

PROCESS FOR CONTROLLING MONOMER RATIO IN COPOLYMERIZATION REACTION

The present invention relates to a process for controlling the ratio of two monomers in a copolymerization ...e, wherein the first monomer is provided at least in part by unreacted monomer from a first reaction zone. It is particularly applicable to the production of an ethylene-propylene block copolymer, wherein propylene is homopolymerized in the first reaction zone and the effluent therefrom, containing living polypropylene chains and unreacted propylene, is then charged into a second reaction zone wherein ethylene is added for reaction (along with some of the propylene) onto the living polypropylene chains as a block segment. In order to control the physical properties of the final product, the ratio of propylene to ethylene in the second zone must be controlled within a fairly limited range.

An exemplary of the copolymerization process, the Ziegler catalyzed polymerization of propylene and ethylene in a diluent such as xylene has been chosen. It is to be stressed, however, that the present invention is applicable to reaction systems other than Ziegler polymerization and also to processes other than block copolymerization of two homopolymers. For example, the present invention is applicable to a two-stage reaction wherein a blend of homopolypropylene and a random ethylene-propylene copolymer is to be produced, in which unreacted propylene from the first reaction zone is to be used as at least a part of the propylene to be reacted with ethylene in the second zone.

Using the block copolymerization process as an example, the homopolymerization in the first reaction zone is carried out by introducing propylene, catalyst (such as a titanium trichloride-diethyl aluminum chloride catalyst system), and a reaction diluent into a first reaction zone under polymerization conditions including a temperature from 100° to 200° F., preferably 160° F., and a pressure from 75 to 400 p.s.i.g., preferably 200 p.s.i.g. Hydrogen may be introduced as a means for controlling the molecular weight of the homopolypropylene which is to be produced. The total effluent from the first reaction zone, including the catalyst system, is thereafter charged into a second reaction zone, wherein the copolymer product is obtained by adding ethylene and a portion of the unreacted propylene onto the living polypropylene chains produced in the first reaction zone. The catalyst system introduced into the first reaction zone is carried through into the second reaction zone in order to provide the catalyst for the reaction which takes place therein; in block copolymerization the catalyst carries the "living polypropylene" into the second zone.

This copolymerization sequence has been shown in the prior art, such as in the patent to Short, U.S. Pat. No. 3,318,976. Short discloses the overall process and discusses the necessity of controlling the ethylene-to-propylene mol ratio in the second reaction zone, but does not provide a solution to the problem. Holzer et al., U.S. Pat. No. 3,262,992, and Crawford et al., U.S. Pat. No. 3,328,486, disclose the batch copolymerization of monomers wherein a scavenging process is used intermediate the introduction of the two monomers. Neither of these patents, however, discloses any way in which the ratio of ethylene to propylene in a second reaction zone can be controlled in the face of a varying supply of propylene from the first reaction zone.

The homopolymerization of propylene is carried out under conditions known in the art. However, even under normally lined-out conditions, the degree of conversion of the propylene charged to the homopolymerization zone will vary; for example, between 90 and 95 percent. Although this difference in conversion appears to be small, when the amount of propylene remaining unconverted is used as the base, it is seen that a decrease in conversion from 95 to 90 percent will double the amount of propylene remaining unreacted and charged to the second reaction zone. It is this variation in the propylene supplied as part of the first reaction zone effluent which gives rise to the problems of controlling the ethylene-to-propylene mol ratio in the second reactor. The wide variation causes substantial changes in the properties of the copolymer product, as will be seen from the following table which discloses changes in the physical properties of a copolymer product during periods of substantially lined-out commercial operations.

TABLE I

| Run | $C_2^=/C_3^=$ feed to second reactor, lb./lb. | $C_2^=$ —mol percent in polymer | Melt index | Stiffness | Izod 0° F | Izod −40° F. | Ether solubles Dry cake | Ether solubles Total slurry |
|---|---|---|---|---|---|---|---|---|
| 192 | 1.06 | 17.8 | 2.9 | 104,100 | 31.8 | 22.5 | 9.8 | 12.6 |
| 190 | 1.85 | 17.0 | 2.7 | 110,700 | 23.6 | 14.4 | 7.2 | 11.1 |

Referring to table I, it can be seen that the Izod impact strength decreased from 31.8 foot-pounds per inch to 23.6 foot-pounds per inch (at 0° F.) even though the flexural stiffness was maintained substantially constant. The loss of impact strength resulted from the change in the ethylene-to-propylene mol ratio from 1.06 to 1.85, since the melt index and total ethylene content were held substantially constant.

The present invention provides a way of controlling the amount of propylene which is introduced into the second reaction zone as part of the effluent from the first reaction zone, by controlling the temperature and pressure of a flash zone such that the effluent is stabilized under conditions which yield a liquid phase saturated with dissolved propylene. Knowing the solubility of propylene with liquid phase under the temperature and pressure conditions chosen, the amount of dissolved propylene is known and is maintained constant. Additional propylene may be added into the second-stage reactor if the constant amount is less than that which is desired, or the temperature and pressure of the zone can be chosen to provide the desired amount of propylene in the stabilized effluent, and additional propylene may be added into the flash zone. Alternatively, propylene may be added both into the flash zone and into the second reactor.

The flash zone is operated under conditions generally including a temperature within the range from 100° to 200° F., preferably 160° F., and a pressure within the range from 0 to 100 p.s.i.g., preferably 25 p.s.i.g. The residence time of the first reactor effluent in the flash zone is sufficient to allow the mixture to become stabilized by either removing the excess propylene from the liquid phase or adding the required amount of additional propylene into solution in the liquid phase. Heat may be supplied to the flash zone to offset the requirements of the latent heat of vaporization of the propylene which is removed from the flash zone, or heat may be removed from the flash zone; e.g., if insufficient propylene is available in the first reactor effluent and the temperature is higher than that which is desired. Generally, the flash zone will be operated at a pressure which is lower than that of the first reaction zone by at least 25 p.s.i.g., the pressure usually being from 25 to 275 p.s.i.g. lower than that in the first reaction zone. The pressure in the second reaction zone may be either higher or lower than that of the flash zone, as desired, but usually will be substantially the same as that in the flash zone or slightly lower.

The second reaction zone is generally operated under conditions including a temperature of 100° to 200° F., preferably 140° F., and a pressure from 10 to 300 p.s.i.g., preferably 25 p.s.i.g. In this reaction zone, ethylene is introduced, and possibly additional propylene, so as to obtain an ethylene-to-propylene mol ratio based on feed streams within the range from 1.0 to 6.0, preferably 3.0. If desired, hydrogen may also be introduced into this second zone.

The present invention can be better understood by reference to the attached drawings wherein.

Figure 1:
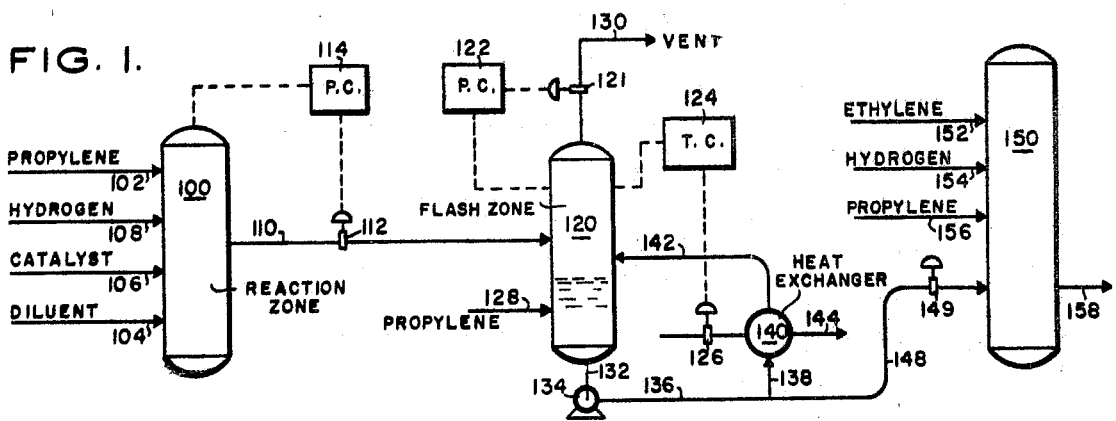
FIG. 1 is a schematic representation of a preferred mode of carrying out the present invention.

Referring now to FIG. 1, it is seen to include a first reaction zone 100 into which are introduced the materials required for the homopolymerization of propylene. Propylene is introduced by way of line 102; diluent, such as xylene, is introduced by way of line 104; catalyst is introduced by way of line 106; and hydrogen is introduced by way of line 108. The reaction is carried out under conditions well known in the art so as to obtain a first reactor effluent which contains catalyst, diluent, unreacted propylene, homopolypropylene, and living chains of polypropylene. This effluent is removed by way of line 110, passed through a control valve 112 and introduced into a flash zone 120. The flash zone 120 is maintained at a controlled pressure by means of the pressure controller 122, which senses the pressure within the flash zone 120, obtains a signal proportional to that pressure, and controls the valve 121 in response to that signal. The temperature is controlled by means of a temperature controller 124, which senses the temperature within the flash zone 120 and controls the amount of heat indirectly supplied to the flash zone by controlling valve 126, as will be more fully described hereinafter.

If the amount of propylene present in the first reactor effluent is not sufficient to saturate the liquid phase in the flash zone 120 under the temperature and pressure conditions chosen, additional propylene may be added by way of line 128. Excess propylene, whether from the first reaction zone or introduced by way of line 128, is removed by way of vent line 130.

A stabilized liquid effluent is removed by way of line 132, and is passed through pump 134 to obtain a higher pressure stream in line 136. A portion of that stream may be passed by way of line 138 through heat exchanger 140 and returned into the flash zone 120 by way of line 142. In the heat exchanger 140, the amount of heat exchange liquid passed in indirect heat transfer relationship with the effluent by way of line 144 is controlled by the valve 126 in response to a signal proportional to the temperature sensed by temperature controller 124. In the event that the propylene in the first reactor effluent is in excess of that required, the heat exchanger 140 will operate to provide heat by raising the temperature of the stream pumped through lines 138 and 142. In the event that the temperature in the flash zone needs to be reduced, the heat exchanger 140 will act as a cooler, and the fluid passed through line 144 will remove heat from the pumparound stream.

The stabilized effluent is passed by way of line 148 through valve 149 and into a second reaction zone 150, wherein a copolymerization reaction is carried out between the living polypropylene chain, unreacted propylene in the stabilized effluent, and ethylene which is added by way of line 152. Hydrogen may be added by way of line 154 and additional propylene may, if desired, be added through line 156.

The second reaction zone is carried out under conditions well known in the art including a temperature from 100° to 200° F., preferably 140° F., a pressure from 10 to 300 p.s.i.g., preferably 50 p.s.i.g., and at an ethylene-to-propylene mol ratio based on feed streams from 1.0 to 6.0, preferably 3.0. The effluent from the second reaction zone is removed by way of line 158 and will include a copolymer product such as an ethylene-propylene block copolymer.

Figure 2:
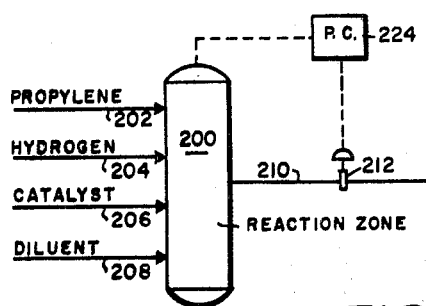
FIG. 2 is an alternative mode of carrying out the present invention wherein the flash zone freely communicates with the second reactor.

The flow diagram of FIG. 2 shows an alternative form of the present invention, wherein a first reaction zone 200 is provided for the reaction of propylene, introduced by way of line 202, in the presence of catalyst, hydrogen, and diluent, which are introduced by way of lines 204, 206 and 208, respectively. The first reaction zone effluent, similarly to the embodiment of FIG. 1, is removed by way of line 210, passed through a control valve 212 and introduced into a flash zone 220. The temperature is controlled in the zone 220 by controller 222, and pressure is controlled by controller 228, in a manner analogous to the control of the flash zone in FIG. 1, except that in the mode of FIG. 2 heat transfer is carried out internally of the flash zone by means of the heat transfer coil 226.

The stabilized effluent is removed from the flash zone 220 and introduced into a copolymerization zone 250 by means of open conduit 252. The reaction in the second reaction zone is similar to that of FIG. 1, with ethylene and hydrogen being introduced by way of lines 254 and 256, respectively, and propylene, if desired, by way of line 258. The vapor phase of the second reaction zone may be removed through the flash zone, if desired.

Figure 3:
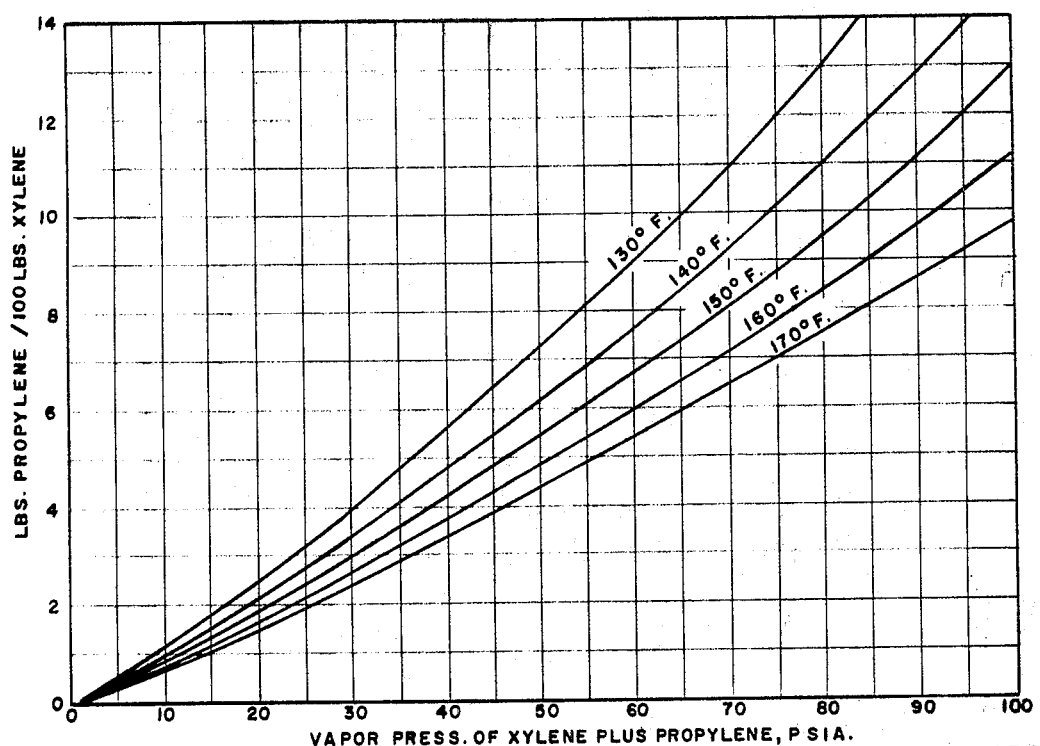
FIG. 3 is a graph showing the effect of temperature and pressure on the solubility of propylene in xylene.

FIG. 3 shows the relationship between the solubility of propylene in xylene with increasing pressure and temperature. A similar solubility curve can be developed for any monomer in a given diluent so that the particular temperature and pressure can be chosen which gives the desired amount of the monomer in the particular diluent used in the first reaction zone. For example, if it is desired to have 4 pounds of propylene dissolved in 100 pounds of xylene, it is seen by reference to FIG. 3 that at 130° F., 30 pounds of pressure will be required, and at 170° F., 47 pounds of pressure would be required. Similar combinations of temperature and pressure intermediate these limits can be chosen from the graph of FIG. 3, and curves representing other temperatures can be developed to allow operation at other pressures if desired.

Having disclosed our invention and a preferred mode of practicing it, what we desire to cover by Letters Patent should be limited only by the appended claims.

We claim:

1. A process for controlling the ratio of two monomers in the second reaction zone of a two-zone polymerization process, wherein the first monomer is polymerized in the first reaction zone and a varying amount of unreacted first monomer resulting from varying conversion thereof is discharged in a first zone effluent from said first reaction zone while dissolved in a reaction diluent, which comprises introducing said first zone effluent into a flash zone which is maintained at a substantially constant pressure less than the pressure of said first reaction zone and at a substantially constant temperature, whereby the maximum solubility of said first monomer in said diluent is kept constant, while supplying to said flash zone an amount of said first monomer in excess of the amount soluble in said diluent at the temperature and pressure of said flash zone, removing from said flash zone substantially all of said first monomer which is not dissolved in said diluent, whereby a stabilized effluent is obtained, and charging said stabilized effluent to a second reaction zone with a second monomer.

2. A process in accordance with claim 1 wherein the first monomer is supplied to said flash zone exclusively by said first zone effluent.

3. A process in accordance with claim 1 wherein the first monomer is propylene and the second monomer is ethylene.

4. A process for controlling the ratio of propylene to ethylene in the second reaction zone of a two-zone polymerization process, wherein propylene is polymerized in the first reaction zone and a varying amount of unreacted propylene resulting from varying conversion thereof is discharged in a first zone effluent from said first reaction zone while dissolved in a reaction diluent, which comprises introducing said first zone effluent into a flash zone which is maintained at a substantially constant temperature and at a substantially constant pressure which is from 25 to 275 p.s.i.g. lower than the pressure of said reaction zone, whereby the maximum solubility of propylene in said diluent is kept constant, while supplying to said flash zone an amount of propylene in excess of the amount which is soluble in said diluent at the temperature and pressure of said flash zone, removing from said flash zone substantially all of the propylene which is not dissolved in said diluent, whereby a stabilized effluent is obtained, and charging said stabilized effluent to a second reaction zone with ethylene.

5. A process in accordance with claim 4 wherein the flash zone temperature is within the range from 130° to 170° F. and the flash zone pressure is within the range from 30 to 47 p.s.i.g.

6. A process in accordance with claim 4 wherein the flash zone temperature is about 130° F. and the flash zone pressure is about 30 p.s.i.g.

7. A process in accordance with claim 5 wherein in the first reaction zone the temperature is from 100° to 200° F. and the pressure is from 0 to 100 p.s.i.g., and in the second reaction zone the temperature is from 100° to 200° F. and the pressure is from 10 to 300 p.s.i.g.

8. A process in accordance with claim 7 wherein in the first reaction zone the polymerization is carried out in xylene as a diluent, in the presence of a Ziegler catalyst, and the first zone effluent contains living polypropylene chains, the ethylene-to-propylene ratio in the second reaction zone is from 1:1 to 6:1, and a block copolymer is obtained from said second reaction zone.

9. A process in accordance with claim 8 wherein heat is added to the flash zone by the steps of
   a. removing from said flash zone a portion of the stabilized effluent,
   b. indirectly heating said portion, and
   c. returning said heated portion to said flash zone.

10. A process in accordance with claim 9 wherein the pressure in said flash zone is controlled by the steps of
   a. sensing the pressure in said flash zone,
   b. obtaining a signal proportional to said sensed pressure, and
   c. controlling the pressure drop between said first reaction zone and said flash zone in response to said signal.

* * * * *